Feb. 20, 1934.   C. B. BAILEY   1,948,252
SHEET PACKING
Filed July 18, 1931
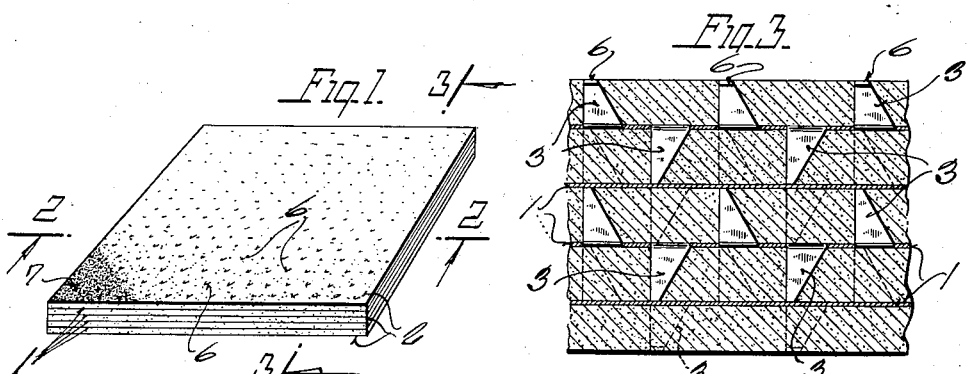
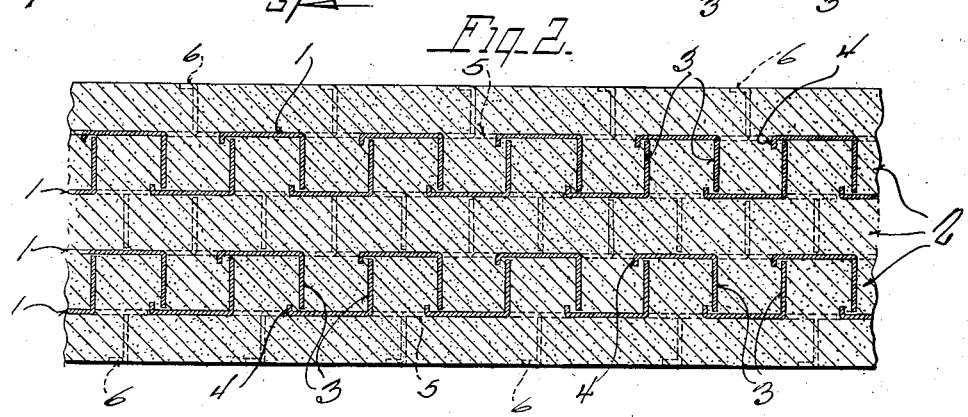
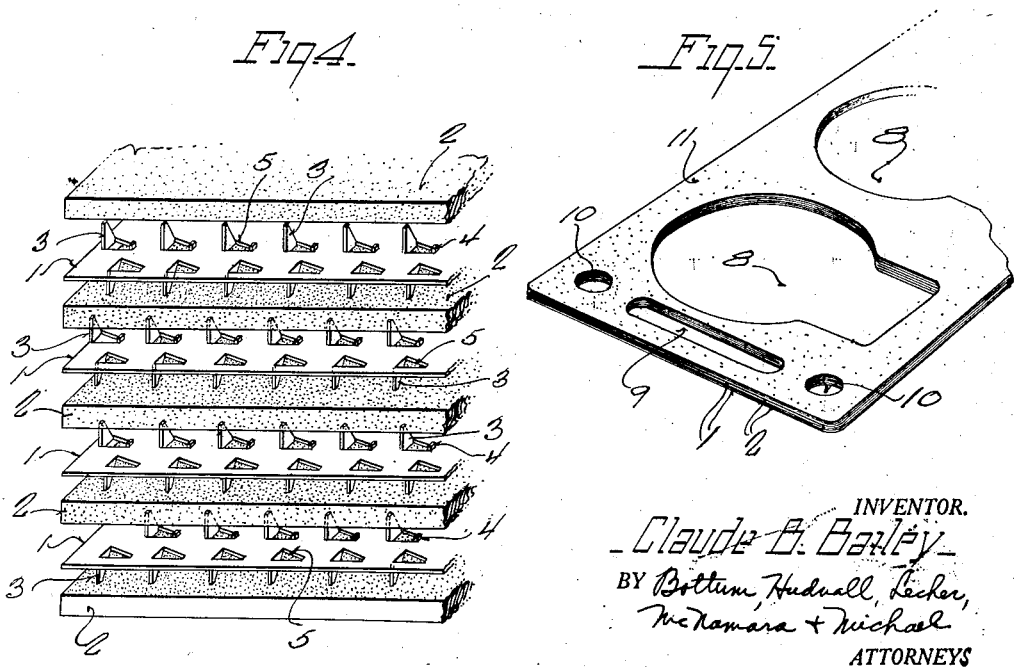
INVENTOR.
Claude B. Bailey
BY Bottum, Hudnall, Lecher,
McNamara + Michael
ATTORNEYS Patented Feb. 20, 1934

1,948,252

UNITED STATES PATENT OFFICE 1,948,252

SHEET PACKING

Claude B. Bailey, Wyandotte, Mich., assignor to McCord Radiator & Mfg. Co., Detroit, Mich., a corporation of Maine Application July 18, 1931. Serial No. 551,664

1 Claim. (Cl. 154—45.5)

This invention relates to composite sheets for gasket and packing purposes.

The main object of the invention is to form the sheet of a multiplicity of layers of metallic and non-metallic sheet material, with prongs or projections on the metal layers extending into and engaging the non-metallic layers for securing the layers together. By this arrangement, the thickness of the sheet may be varied as desired, by increasing or decreasing the number of layers.

Another object of the invention is to locate the metal layers between the non-metallic layers so that the outer sides of the composite sheet may be formed of non-metallic material for joint sealing purposes.

A further object of the invention is to provide the prongs or projections on opposite sides of each of the metal layers so that a maze of prongs will be provided for each intermediate non-metallic layer to prevent displacement thereof when under compression.

A further object of the invention is to turn or bend over the outer ends of the prongs on the outer sides of the outermost metal layers into clinching engagement with the outermost non-metallic layers to secure them to the metal layers.

The invention also relates to gaskets made from the composite sheet referred to.

In the accompanying drawing:

Fig. 1 is a top plane view of a composite sheet constructed in accordance with my invention;

Figs. 2 and 3 are enlarged fragmentary sectional views taken on lines 2—2 and 3—3, respectively of Fig. 1;

Fig. 4 is a perspective view of the sheet, showing the layers in separated form prior to being pressed together in sheet forming relation; and Fig. 5 is a fragmentary perspective view of gasket blanked for the sheet.

As shown in the drawing, the composite sheet of my invention is made of a multiplicity of metallic and non-metallic layers 1, 1 and 2, 2, respectively. The layers are co-extensive and are arranged in superimposed or overlapping relation with the metal layers 1 alternating with the non-metallic layers 2. Moreover, the layers are arranged with non-metallic layers on the outer sides of the sheet to provide the required sealing surfaces for the sheet when used as a packing or gasket as the case may be. For this purpose, the non-metallic layers 2, 2 are made of a yieldable packing material, which for automotive purposes is asbestos or similar refractory material. The metal layers 1 are preferably made from sheet metal, such as steel, which has the strength required to support the sheet, even though of relatively thin gauge. Moreover, with the metal layers 1 of steel, the prongs or projections, to be presently described, struck out therefrom have the strength necessary to penetrate the non-metallic layers without collapsing when the several layers are pressed together to make the composite sheet.

Each metal layer 1 is provided with a multiplicity of projections in the form of prongs 3, 4 struck out therefrom on opposite sides of the layer and distributed over the entire surface thereof. The prongs are preferably arranged in rows extending lengthwise of the layer with the prongs in one row staggered or offset with respect to the prongs in an adjacent row. This disposes the prongs in one row intermediate the prongs in the adjacent rows and thus provides for an effective distribution of the prongs over the layer within the margin thereof.

In the drawing, the prongs 3, 4 of each row are shown as being alternately long and short with a long prong 3 at one end of each opening 5 made in layer 1 in striking out the prongs and a short prong 4 at the opposite end of the opening. This accords with the disclosure in my co-pending application, Serial No. 533,049, in which application I claim the prongs per se. The prongs may be given the shape and form best suited for the purpose. They may be made in the form of right angle triangles as disclosed in my other application, Serial No. 549,602. It is not the intention here to claim any specific form of prong as the present invention relates to the composite sheet composed of a multiplicity, of alternating metallic and non-metallic layers with prongs of a suitable character on the metal layers. Moreover, I do not wish to be limited to a pair of prongs for each opening nor to prongs at the opposite ends of the opening, inasmuch as I may provide only one prong for each opening if desired.

After the prong provided metal layers 1, 1 have been formed, the asbestos or packing layers 2 are laid on the metal layers in the manner shown in Fig. 4, whereupon the assembly is pressed together with sufficient pressure by a roller or other press to bring the layers into intimate contact and to cause the prongs on the metal layers to penetrate and be embedded in the packing layers. In entering the packing layers, the prongs secure or anchor the packing layers to the metal ones and provide a unitary structure for the composite sheet. The long prongs are made long enough to extend into the packing layers to the extent desired, it being preferable to have such prongs either substantially equal to the thickness of the packing layers or somewhat short of such dimension in order that the long prongs on the intermediate layers will not contact to any appreciable extent with the adjacent metal layers to be bent into clinching engagement with the engaged packing layers. In this way, the long prongs on the intermediate metal layers are not bent over and consequently remain embedded in the engaged packing layers in their initial projecting relation. With the long and short prongs distributed over the entire surfaces of the metal layers and coming relatively close to the marginal edges of such layers, the prongs engage the packing layers over the entire extent thereof and thus effectively anchor and secure the packing layers to the metal layers. The pressure on the outer sides of the sheet is sufficient to bend the outer ends 6 of the long prongs on the outer sides only of the outermost metal layers into clinching engagement with the outermost packing layers to anchor and secure such layers to the adjacent metal ones, as shown in Fig. 2.

The outer surfaces of the composite sheet may be coated with graphite if desired, as indicated in 7, Fig. 1 to prevent the composite sheet or gasket cut therefrom from adhering or sticking to the members between which the sheet or gasket is clamped.

While I have described my improvement as being applicable to the automotive field, yet the sheet may be used as a packing or gasket for use in other fields, as for example, in the steam and water handling fields. The packing layers 2 are sufficiently yieldable to provide the cushion required for the sheet or gasket as the case may be, and also to provide leak proof joints required between the members between which the sheet or gasket is clamped when in use. In making the composite sheet of a multiplicity of layers, the thickness of the sheet may be varied as required by merely increasing or decreasing the number of layers. By reason of the similarity of the metal layers, an increase or decrease of the thickness of the sheet, is rendered possible without materially affecting the cost of manufacture of the sheet. This is an important factor of my invention in that the gasket manufacturer may furnish gaskets of various thicknesses which would make it possible for a user to have any degree of compression he wanted, and they could all be cut from the same die. Moreover, with metal layers on opposite sides of each intermediate packing layer, the prongs extending into the same from opposite sides thereof form a maze to hold the packing layer from displacement in the plane thereof when under pressure.

In Fig. 5, I have shown a cylinder head gasket blanked from a composite sheet as herein described. The gasket has the neccessary holes or openings 8, 9 and 10 cut through its body layer 11. The openings 8 fit about the combustion chambers of the engine block. The openings 9 are the water passage openings and the openings 10 are for the stubs by which the gasket is clamped between the cylinder block and its head and the latter secured to the block. The body layer 11 is in the composite form described, composed of alternating metallic and non-metallic layers 1, 2 with prongs on the metal layers. Any other gasket would have the same body structure when blanked from the sheet herein shown and described.

The details of construction shown and described may be variously changed and modified without departing from the spirit and scope of my invention, except as pointed out in the annexed claim.

I claim as my invention:

Sheet packing, comprising a plurality of superimposed layers of metallic and non-metallic material, said layers being arranged with the metal layers between the non-metallic layers and with the outer sides of the sheet formed by non-metallic layers, and a multiplicity of prongs struck out from the metal layers on opposite sides thereof and extending into the non-metallic layers for securing the layers together, the prongs on the outer sides of the outermost of the metal layers extending through the adjacent non-metallic layers and having their outer ends bent into clinching engagement with the outer surfaces of said non-metallic layers, the prongs on the other of the metal layers and on the inner sides of the outermost metal layers remaining in their initial struck out positions.

CLAUDE B. BAILEY.